Oct. 30, 1923.
C. TURNER
COOKING UTENSIL
Filed Dec. 8, 1921
1,472,376
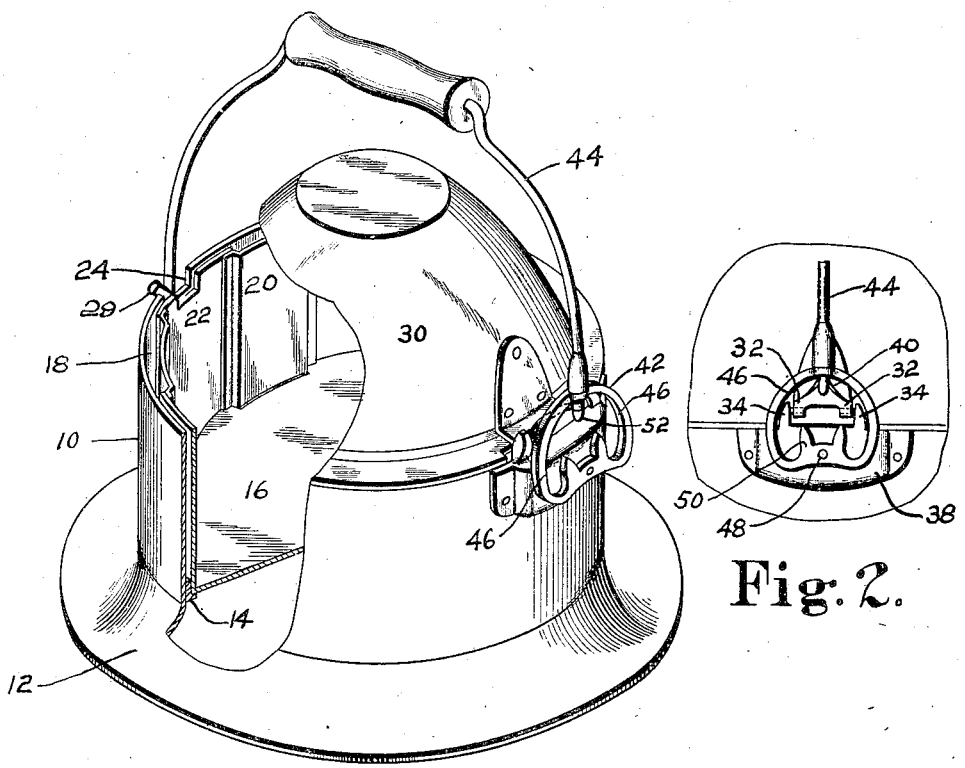
Fig. 1.
Fig. 2.
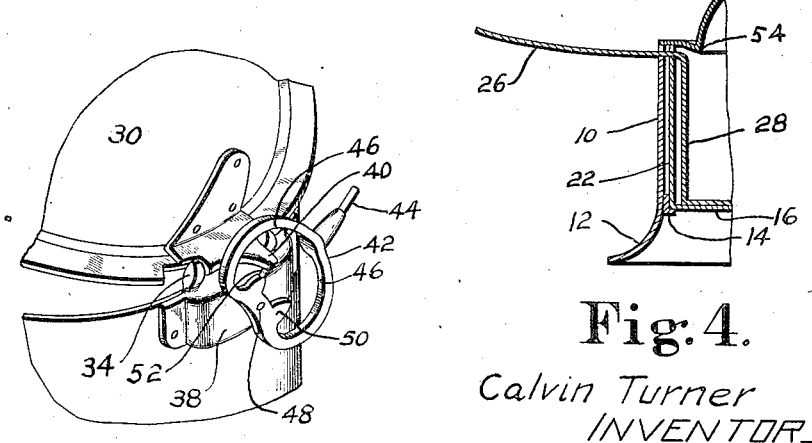
Fig. 3.
Fig. 4.
Calvin Turner
INVENTOR
By
Romeyn A. Share.
ATTORNEY.

Patented Oct. 30, 1923.

1,472,376

UNITED STATES PATENT OFFICE.

CALVIN TURNER, OF BANGOR, MAINE.

COOKING UTENSIL.

Application filed December 8, 1921. Serial No. 521,023.

*To all whom it may concern:*

Be it known that I, CALVIN TURNER, citizen of the United States, residing at Bangor, in the county of Penobscot and State of Maine, have invented certain Improvements in Cooking Utensils, of which the following is a full, clear, and exact description.

This invention relates to cooking utensils and is herein shown as embodied in an oven for use on the top of a stove or other heating device.

An object of the invention is to provide an improved cooking utensil which will require a small expenditure of heat, eliminate cooking odors and transmit the heat evenly to all parts of the food. As a feature of the invention, an inclosure or casing having a flaring lower portion to concentrate the heat is provided with a communicating baking or cooking compartment which will seal the food therein from contact with gases or odors emanating from the fire and yet transmit the heat evenly to all sides of the food therein.

Another object is to furnish an improved oven or cooker which is readily and safely accessible and which will enable the food therein to retain its natural flavor without spattering of fat, grease etc. upon the stove or other heating device. As one feature of the invention, the cooker has an improved cover actuating device so constructed that the cover can be moved easily and with a minimum expenditure of energy from closed to open position and vice versa by a simple manipulation of a lifting bail. The construction is such that the cover and bail are maintained balanced in any convenient or desired position and it is unnecessary to touch the cover when moving it from either open or closed position. This feature is an improvement on patent to Wilmot 489,173 granted Jan. 3, 1893. In the illustrated construction, this result is accomplished by an improved cam carried by the lifting bail.

Other objects and features of the invention will appear from a consideration of the following specification in connection with the accompanying drawing in which—

Fig. 1 is a perspective view of the cooker partly in section and cut away to show interior construction.

Fig. 2 is a partial elevation showing the cam for raising the cover.

Fig. 3 is a perspective view showing the cover in partly raised position.

Fig. 4 is a vertical section showing the interior vessel which contains the food.

The cooker comprises a main inclosure or casing with a substantially vertical side wall 10 flaring outwardly at the bottom as indicated at 12. This flaring portion of the side gathers the heat and concentrates it within the inclosure where it is transmitted uniformly to all portions of the food. A circular flange 14 projecting from the inner side of the wall 12 serves as a support for a container 16 which is of generally cylindrical shape with the bottom and side wall cut out at intervals as at 18 to form passages for heat. The passages or flues are closed on the inside by securing flanged U-shaped plates 20 to the upright side sections 22 across the cut away portions. It is found that, in a container 12 inches in diameter, these passages should be one inch by one quarter inch in order to produce the proper balance of the heat at the top, side and bottom of the food container.

Both the container 16 and the inclosure 10 have slots 24 cut in the side walls to permit the passage of the handle 26 on a food receptacle 28 which rests within the container 16. The slots are made sufficiently wide to take the widest handle likely to be met with, and if a narrower handle is used, the container 16 may be partially rotated by a suitable knob 29 to make the combined openings exactly fit the handle and prevent waste of heat.

A dome shaped lid or cover 30 is hinged by a detachable hinge to the side wall of the inclosure and is lifted to permit insertion of the food receptacle 28. The hinge has spaced bearing portions 32 resting on pintles (see Fig. 2) extending toward each other from spaced projections 34 on a casting 38 fastened to the inclosure. The hinge has an extension 40 projecting upwardly and outwardly for cooperation with a lifting cam 42 preferably integral with the usual bail or handle 44. As shown, the cam is pivoted to swing on an axis 48 at right angles to the axis of the cover. The cam 42 has interior cam surfaces 46, 46 which are formed (from the point nearest the bail) in curves lying in a spiral which gradually approaches the cam pivot or focus 48 until the lugs 50 are reached. The lower part of the cam is depressed inwardly somewhat out of the plane of the rest of the cam so that it is nearer to the hinge of the cover. When the bail is swung down, the cover is therefore raised gradually with the least possible effort. Since the part of the cam nearest its pivot is nearer to the hinge of the cover, it is apparent that the bearing point of the cam on the upper side of the extension will gradually shift inwardly toward the hinge as the cover rises. The cover would naturally require a greater lifting force at first but the greater leverage thus obtained at the beginning renders the motion easy and the cover and the bail are thus maintained in a condition of balance. The same result may also be secured by curving the plane of the cam outwardly from the pivot 48. In order to prevent the open cover falling over backwards, if struck by an extraneous object, a lug 52 on the under side of the extension contacts with the outer side face of the cam at the point 50 near the hinge of the cover when the cover is about to become overbalanced and thus limits its movement.

It should be noted that the food within the receptacle is kept from contact with odorous gases rising from the fire due to the fact that the vapor driven off from the food fills the upper portion of the container and seals the upper ends of the flues. The inner surface of the dome or cover lies within the perimeter of the food container as indicated at 54 in Fig. 4 so that all condensed moisture and juices are returned to the food.

Although the invention has been shown and described with reference to a specific embodiment, it should be understood that the invention is not necessarily limited thereto.

I claim:

1. In a device of the class described, an inclosure having a flaring side wall to concentrate the heat within the interior, a container supported within the inclosure above the bottom thereof, said container having depressions at the side to form flues.

2. In a device of the class described, an inclosure to rest upon a heating device, a container supported within the inclosure and having depressions in the side wall forming flues to convey heat to the space above the container, and a dome closing the space above the container.

3. In a device of the class described, an inclosure for use over a fire, a container supported within the inclosure, above the bottom thereof and having passages at the side, a dome closing the space above the container and having its inner surface terminating within the perimeter of the container to return the condensed moisture to the food.

4. In a device of the class described, an inclosure for use over a heating device, a container supported within the inclosure and having side wall sections and cut out portions in the bottom, and U-shaped plates joining the side wall sections to form flues leading from the space below to the space above the container.

5. In a device of the class described, an inclosure for use over a heater, a container supported within the inclosure for partial rotation therein, registering slots in the container and the inclosure for passage of the handle of a food receptacle, means for rotating the container to cause its slot to fit the handle, and a cover for the receptacle.

6. In a device of the class described, an inclosure, a cover hinged to the inclosure and having an extension projecting beyond the hinge, a cam pivoted to the inclosure below the hinge and having an inner cam surface in the form of a spiral curve gradually approaching the cam pivot to engage the upper surface of the extension to operate the cover, said cam having a side surface near its pivot to engage the under side of the extension to prevent the cover from becoming overbalanced, and a handle secured to the cam to actuate the same.

7. In a device of the class described, an inclosure, a cover hinged to the inclosure and having an extension projecting beyond the hinge, a cam pivoted to the inclosure below the hinge and having an inner cam surface in the form of a spiral curve gradually approaching the cam pivot to engage the upper surface of the extension to operate the cover, said cam having its lower portion depressed inwardly nearer to the hinge of the cover, a side face on the cam to engage the under side of the extension to prevent the cover from becoming overbalanced, and a handle secured to the cam.

8. In a device of the class described, an inclosure, a cover hinged to the inclosure and having an extension projecting beyond the hinge, a cam pivoted to the inclosure and having an inner cam surface to engage the upper surface of the extension to actuate the cover, said cam having a side surface near its pivot for engaging the under side of the extension to prevent the cover from becoming overbalanced, and means for actuating the cam.

9. In a device of the class described, an inclosure, a cover hinged to the inclosure and having an extension beyond the hinge, an oscillatable grasping member pivoted to said inclosure to swing at an angle to the cover, and a substantially heart shaped cam secured to the grasping member for engaging the extension to open or close the cover.

In testimony whereof I have signed my name to this specification.

CALVIN TURNER.